UNITED STATES PATENT OFFICE.

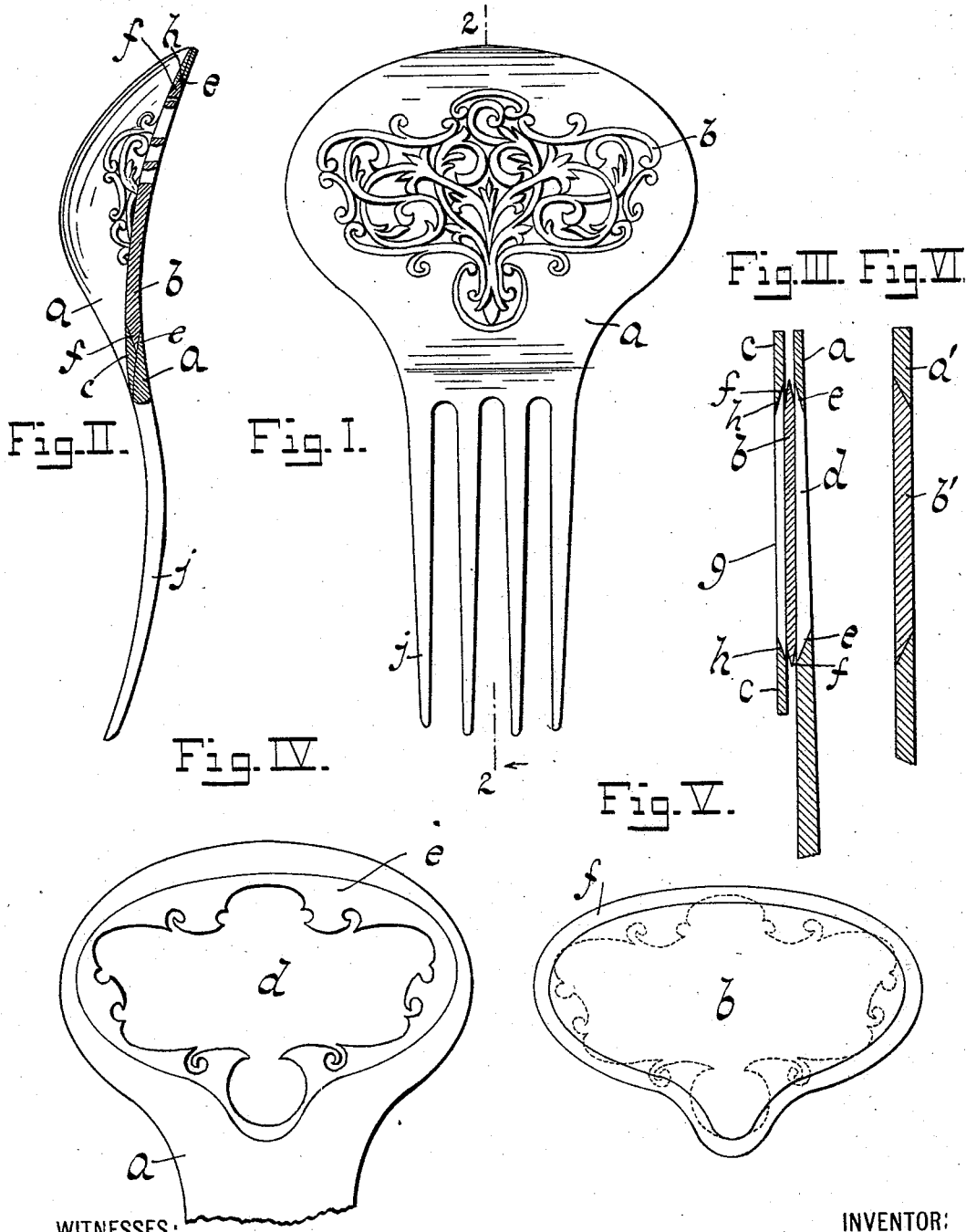

WILLIAM S. BECHTOLD, OF NEWARK, NEW JERSEY.

MANUFACTURE OF ARTICLES FROM TORTOISE-SHELL.

SPECIFICATION forming part of Letters Patent No. 539,719, dated May 21, 1895.

Application filed December 8, 1894. Serial No. 531,185. (No specimens.)

*To all whom it may concern:*

Be it known that I, WILLIAM S. BECHTOLD, a citizen of the United States, and a resident of Newark, in the county of Essex and State of New Jersey, have invented certain new and useful Improvements in the Process of Manufacturing Articles from Tortoise-Shell, &c., of which the following is a specification.

My invention has reference, first, to a new method for the manufacture of articles of tortoise shell and other material which can be softened and welded together by the combined action of heat and pressure, and, secondly, to the articles produced by such method.

Heretofore it has been customary to make back combs and other ornamental articles from one piece of shell; and consequently such articles possessed individually but one shade or color.

The object of my present invention is to produce the articles above referred to in two or more contrasting shades or colors by the insertion of shell of different shade or color into the main body of the article, and in such a manner that the union or joint is not perceptible while the part inserted can be subsequently ornamented in any desired manner.

The nature of my invention will best be understood when described in connection with the annexed sheet of drawings, in which—

Figure 1 represents a face view of a back comb constructed according to my invention. Fig. 2 is a section in the plane 2 2, Fig. 1. Fig. 3 is a longitudinal section showing the juxtaposition of the parts before welding. Fig. 4 is a face view showing the manner of cutting the body of the comb prior to the insertion of the piece to be inlaid. Fig. 5 is a face view of the piece to be inlaid. Fig. 6 is a longitudinal section illustrating a modified manner of uniting the parts.

Similar letters of reference designate corresponding parts throughout the several views of the drawings.

In carrying out my invention a suitable piece of shell $a$, say of a dark shade or color, is selected, and preferably cut to a form approximating that of the article to be produced. A second piece of shell $b$, of a light color or shade, say a piece of what is commonly known as "amber" shell, is selected and cut approximately to the contour of the finished design, (Fig. 5.) Into the blank $a$ is cut an opening $d$ approximating the outer contour of the piece $b$, but smaller than the same. The edges $e$ of this opening are beveled by grinding, or in any other suitable manner, while the edges $f$ of the piece $b$ are beveled from both sides. A third piece of material $c$ corresponding in color to that of the blank $a$ is selected and formed with an opening $g$ corresponding to that in the blank $a$ and having its edges $h$ similarly beveled. Piece $b$ is now placed between parts $a$ and $c$ and the whole placed into an apparatus in which it is subjected to the combined action of heat and pressure, whereby the shell is softened and the parts become firmly welded or knitted together under the pressure brought to bear thereon. The blank is then removed and the double thickness of the outer shell reduced by grinding, or otherwise until brought to, or approximately to, the level of the inlaid piece. The inlaid piece is then suitably ornamented, preferably to an open work pattern, as shown, by the use of a fret-saw. The contour of the design may be suitably carved. The teeth or prongs $j$ are then cut and the proper curvature imparted to the comb by bending the same while soft over a form in a well known manner.

As shown in Fig. 6, the third piece $c$, made use of in the preceding example, may be dispensed with, and the piece $b'$ fitted directly into the blank $a'$,—the former being then beveled from one side only. The first described method, however, gives the best result.

In this manner I am enabled to produce at a low cost articles highly ornamental and quite different in appearance from those heretofore made of tortoise shell. Furthermore by forming the article with the surrounding plain border as shown, a much stronger article is produced since no delicate projecting parts, liable to be broken, are present.

While I have described the present method as applied to the manufacture of articles from tortoise shell it is evident that it can equally well be applied to rubber, celluloid or like material which is rendered soft by heat. Therefore I do not wish to restrict myself to such shell. Furthermore I do not wish to restrict myself to beveling the edges of the several parts since it is evident that other forms could be given to such edges with the same result.

I am aware that heretofore metal has been inlaid with tortoise shell and celluloid, but in the article so produced the base and inlaid parts are not welded together to form a practically integral article. The article, furthermore, shows clear and distinct lines of demarcation between the parts. The article produced according to my invention is practically integral and shows no lines of demarcation.

What I claim as new is—

1. The herein described method for the manufacture of ornamental articles from tortoise shell, and the like, consisting in forming a blank with an opening similar to, but smaller than, the part of contrasting shade or color to be inserted, then placing the parts in proper juxtaposition and subjecting the same to the combined action of heat and pressure to knit or weld the parts together, and finally ornamenting the inlaid part.

2. The herein described method for the manufacture of ornamental articles from tortoise shell and the like, consisting in placing the part of contrasting shade or color to be inserted between two external portions provided with beveled openings similar to but smaller than the portion to be inserted, then subjecting the parts thus placed together to the combined action of heat and pressure to knit or weld the parts together, and finally ornamenting the inlaid part.

3. As a new article of manufacture, an ornamental article of tortoise shell and the like, consisting of a base and an inlaid ornamental part of like material as the base, but of contrasting color and forming with said base an integral piece without perceptible line of demarcation between the contours of the parts united, substantially as described.

In testimony that I claim the foregoing as my invention I have signed my name, in presence of two witnesses, this 1st day of December, 1894.

WILLIAM S. BECHTOLD.

Witnesses:
G. McQUILLAN,
HERBERT W. KNIGNT.